US008335710B2

(12) United States Patent
Pennay

(10) Patent No.: US 8,335,710 B2
(45) Date of Patent: Dec. 18, 2012

(54) UNIDIRECTIONALLY PROTECTED, FULLY AUTOMATED ASSET ALLOCATION AND ASSET MONITORING APPARATUSES, AND A CORRESPONDING METHOD

(75) Inventor: Richard Pennay, New York, NY (US)

(73) Assignee: Swiss Reinsurance Company Ltd., Zürich (CH)

( * ) Notice: Subject to any disclaimer, the term of this patent is extended or adjusted under 35 U.S.C. 154(b) by 1195 days.

(21) Appl. No.: 12/165,535

(22) Filed: Jun. 30, 2008

(65) Prior Publication Data
US 2009/0063236 A1 Mar. 5, 2009

Related U.S. Application Data

(60) Provisional application No. 60/946,823, filed on Jun. 28, 2007.

(51) Int. Cl.
G06B 19/418 (2006.01)

(52) U.S. Cl. ............... 705/8; 705/36 R; 705/347; 705/4; 709/206

(58) Field of Classification Search ............ 705/4, 36 R
See application file for complete search history.

Primary Examiner — Vanel Frenel
(74) Attorney, Agent, or Firm — Oblon, Spivak, McClelland, Maier & Neustadt, L.L.P.

(57) ABSTRACT

A computer-aided asset allocation and asset monitoring apparatus comprising a unidirectional, data-protected control signal apparatus, in which data from locally arranged, protected databases can be transferred via a network to the asset allocation and asset monitoring apparatus and can be evaluated and in which electronic control signals and/or control data can be transmitted to at least one authorized receiver station.

27 Claims, 10 Drawing Sheets

UNIDIRECTIONALLY PROTECTED, FULLY AUTOMATED ASSET ALLOCATION AND ASSET MONITORING APPARATUSES, AND A CORRESPONDING METHOD

BACKGROUND OF THE INVENTION (a) Field of the Invention

The present invention relates to the field of automated, computer-aided asset allocation and asset monitoring apparatus in connection with automated alarm, monitoring or control systems. Data from locally arranged, protected databases can be transferred via a network to the asset allocation and asset monitoring apparatus and can be evaluated and in which electronic control signals and/or control data can be transmitted to at least one authorized receiver station. In particular, the invention relates to an asset allocation and asset monitoring apparatus in connection with automated alarm, monitoring or control systems.

(b) Brief Description of the Related Art

For the last 30 to 40 years, the technological world, particularly the opportunities for technical implementation of automated apparatuses for control and monitoring of complex systems, has changed fundamentally. Contributions to this have been made by the appearance of new and fast data systems together with memory units with, until then, unimaginable storage capacity. In addition, the sensor technology has become cheaper to the extent that measurement data can be collected and are collected in vast volumes and at marginal cost in almost all technical fields. This volume of data allows the design of new and, on the basis of the available data, more accurate monitoring and control systems. The technical implementation of the monitoring and control systems may be based both on statistical or stochastic modules and on extrapolation modules, particularly realtime extrapolation modules. Frequently, however, these measurement data which are required by the monitoring and control systems are sensitive data which are provided only under protection and/or under access control and frequently for a fee. These sensitive data may be subject both to copyright and to know-how protection. In many cases for control and monitoring, however, not all but rather only the smallest proportion of the information covered by the measurement data is required. Access to all the measurement data required may then be unattractive for the system or make little technical sense for a wide variety of reasons, for example because it is too expensive or because the complex evaluation is excessive or too time-consuming. In realtime systems, this may mean that there is no way of producing automated implementation from a technical point of view, particularly in the case of simpler systems.

Such monitoring and control systems may, at least in part, be coupled to the parameters of the international financial and economic markets or at least be correlated in some way on the basis of them. The international financial and economic markets, particularly with regard to the nonlinearity of the stock-market data, are of such complexity today that most technical implementations of monitoring and control systems which depend on the trend of the market or stock-market parameters experience technical failure in the reliable generation of signal and control data. However, the great boom in the stock markets in recent years has also been accompanied by a rise in the need for the most efficient and up-to-date monitoring and control systems possible for automation. These also include fully automated security portfolio management systems, which allow rapid response to present or expected price fluctuations in the securities. This applies particularly to small and medium-sized investors, since small and medium-sized investors usually have too small a portfolio to be able to set up meaningful and widely supported risk management. However, they frequently lack the know-how required for risk management, the necessary market analysis means and/or market knowledge and also the necessary access to sensitive and protected data. For the large, financially strong investors, the systems available in the background art exhibit the drawbacks that they can barely be reliably automated from a technical point of view, despite access to the relevant data, on account of the vast volume of data and cannot comprehensively take account of the available data when generating the control signals.

The background art contains various technical implementations of automated or semi-automated systems for managing security portfolios. By way of example, this involves evaluating stock-market data using algorithms in order to make statements about future price fluctuations. Examples of such algorithms can be found, inter alia, in "The Point And Figure Method, Victor deVilliers, Windsor Books 1933" or "Das grosse Buch der Technischen Indikatoren, T. Müller and H. Nietzer, Fachverlag für Wirtschaftsinformationen 1993" etc. On account of the highly nonlinear, chaotic behavior of stock-market prices, it is not possible to predict price fluctuations for longer periods even with the most modern prediction algorithms, however. This is another reason why it is extremely important for the investor to be able to react quickly to current or forecast price fluctuations. The background art exhibits various systems which allow a user to manage his portfolio by indicating price fluctuations for securities in his portfolio to him. Examples of these can be found in the U.S. Pat. No. 6,064,985 entitled "Automated portfolio management system with internet datafeed" and U.S. Pat. No. 6,144,947 entitled "System for automatically determining net capital deductions for securities held, and process for implementing same", for example. In all solutions from the background art, the portfolio management systems need to have access to communication links such as the Internet, the PSTN (Public Switched Telephone Network) etc., which are not only used to access the stock-market data servers but can also be used to charge for the services obtained if necessary. The sometimes sensitive and protected data cannot be protected in this case but rather are charged to the user comprehensively.

The automated technical implementations of signal and control apparatuses may also relate to the management of catastrophe bonds or cat bonds. Cat bonds are a relatively new invention and have come about as a result of the failure of conventional intervention systems in the event of large-scale catastrophes. The globalization of the markets, the change of climate with numerous occurrences of catastrophes with a cross-regional effect (tsunamis, hurricanes, typhoons, earthquakes etc.) and the occurrence of a new dimension of terror and wars (e.g. attack on the World Trade Center, Iraq war, bath crisis, hurricanes on the west coast of America (New Orleans), tsunami in Asia) have produced a new dimension of catastrophes which has created the need for new technical options for implementing more efficient automated alarm, monitoring and/or intervention systems or apparatuses in order to be able to effectively intercept such events or their effect. On the one hand, malfunctions need to be prevented or need to be able to be detected and corrected in good time when they occur, and on the other hand it is also intended that such systems will be used to prevent the catastrophes from resulting in destabilization of the economy and/or stock markets or even world markets. In this case, with such intervention apparatuses, not only the type of intervention means (e.g. catastrophe resources, malfunction means etc.) can play a part but also the way in which the monitoring parameters measured by the pickup apparatuses and detection apparatuses are processed and are technically implemented for the purpose of controlling activation units for the intervention means or alarm means. However, it is precisely the technical implementation which causes problems which are very difficult to overcome today. One of the fundamental technical problems is particularly the stability of the systems, whether automated or semi-automated. In addition, the vast volume of data available today at any time from a wide variety of pickup apparatuses and detection apparatuses (e.g. wind speed sensors, satellite pictures, water level sensors, water and wind temperature sensors etc. etc.) makes monitoring through pure human action and perception virtually impossible. The technical implementation of such apparatuses should therefore, if possible, interact both with the pickup apparatuses and with the intervention means in fully automated fashion and in real time.

As far as their technical requirements and hence also their technical implementation are concerned, automated intervention systems differ greatly according to field, since their constraints differ very greatly from field of application to field of application. Thus, large-scale catastrophes, catastrophe damage or industrial accidents (such as the reactor fire in Chernobyl) obey completely different laws than malfunctions in the automotive industry or building sector, for example. The mathematical laws and corresponding methods are known abundantly in the background art. The technical implementation of appropriate signal and control apparatuses eludes the known background art almost entirely even in this field. When coping with malfunctions, caused by single, larger-scale catastrophes such as natural catastrophes, war or terror, coupled or uncoupled intervention systems are known in different variations in the background art. Thus, by way of example, local monitoring sensors and monitoring units connected to a central monitoring apparatus are known which are used for early warning identification and alerting. It is likewise known practice to transmit location-dependent electrical signals from these monitoring apparatuses periodically or upon request for the purpose of automated alarm triggering. Automated intervention monitoring apparatuses and appropriate methods, particularly cash-sum-value-based intervention monitoring apparatuses, as are required for automated insurance systems or damage cover systems, for example, may make up part of the technical implementation of such intervention apparatuses. The operational apparatuses associated with the intervention apparatus can ensure the operation of the intervention apparatus by means of periodic transfer or transfers of assignable, protected units (particularly cash-sum-value-based parameters) upon request, for example. The transfer can be made a plurality of times or once. For certain systems, reference is also made in this case to the operational apparatuses and/or operators being insured. Cash-value-based transfers can also be referred to as remuneration for the transfer (e.g. "cession") of responsibility, e.g. in the form of a premium, in such systems independently of the technical implementation of the apparatus. The "policies" are frequently ascertained using complex mathematical insurance methods. In principle, the technical implementation of the present invention does not relate or relates only partially to cash-value-based elements, of such automated intervention systems, but rather quite generally to asset allocation and asset monitoring apparatuses with automated signal and control apparatuses.

In the background art, the technical implementations of intervention apparatuses usually have far too long a reaction time to be able to react meaningfully to catastrophes of larger proportions. In addition, the ever further reaching consequences result in instabilities which are almost impossible to handle with the ordinary systems. The effect of this is that mechanization can be ruled out to date. However, even unautomated systems are affected by these instabilities and have already resulted in several collapses in the relevant intervention systems. Semi-automated intervention apparatuses with cash-value-based modules having an, if possible, uncorrelated partial risk protection module with an interface to loan markets, what are known as insurance linked securities (ILS), have been known since the mid-1990s and today exhibit capitalization of between 8 and 10 billion US dollars, which documents the great success of these systems. In this case too, the technical implementations of "insurance linked securities"-based modules in the background art differ greatly from one another. The main representatives of the ILS systems are based on what are known as catastrophe bonds or cat bonds. The growing acceptance among large investors shows the worldwide significance of cat bonds. For insurance systems, reinsurance systems and an ever increasing number of industrial apparatuses, cat bonds can effectively be used to produce perennial protection against natural catastrophes etc. without the usual credit risk. Cat bond systems provide investors with attractive returns and the option of reducing a portfolio risk, since cat bonds in name have no correlation in their behavior to all other securities or financial market instruments. Cat bonds are securities or investments having the same function, whose performance rests upon the index of risks on the basis of natural catastrophes. Industrial apparatuses and systems from international firms to local insurance companies have used cat bonds to shove up or reduce their risks. In 2006 alone, the issue of such bonds doubled to over $4.9 billion and the intensity of the growth has continued uninterrupted in the first half of 2007. The growth has additionally been furthered by an increasing demand for cat bonds on the loan market. More and more investors are regarding cat bonds as a diversifying asset class or investment class with an excellent yield upon maturity. While the primary cat bond market continues to grow, the secondary cat bond market is becoming increasingly liquid. 2006 was a record year for the secondary market, in which just the exposure for natural catastrophes exceeded a multi-billion sum.

Despite all of the above describes improvements in the field of automated asset allocation and asset monitoring apparatuses, still further improvements of such apparatuses and methods are desired. For example, reliable automated control signals for portfolio management on the basis of appropriate cat bond indexes have the advantage that the cat bond market can become even more attractive to investors. However, such systems which could meet the demands for security and reliability are not known to date.

SUMMARY OF THE INVENTION

It is therefore an object of this invention to propose a fully automated asset allocation and asset monitoring apparatus which does not have the aforementioned drawbacks. In particular, it is intended to be a solution which allows a new method for asset allocation and asset monitoring to be proposed. In particular, the asset allocation and asset monitoring apparatus is meant to always be able to generate the necessary monitoring and control signals for relevant portfolio elements so as to allow fully automated action and management. At the same time, the asset allocation and asset monitoring apparatus is meant to protect sensitive data and/or measurement data used for signal production without losing information which is necessary or relevant for technical implementation of the automation.

In line with the present invention, this aim is achieved particularly by the elements in the independent claims. Further advantageous embodiments can also be found in the dependent claims and the description.

In particular, the invention achieves these aims by virtue of a fully automated, computer-aided asset allocation and asset monitoring apparatus comprising a unidirectional, data-protected control signal apparatus being able to be used to transfer data from locally arranged, protected databases via a network to the asset allocation and asset monitoring apparatus and to evaluate them and in which electronic control signals and/or control data can be transmitted to at least one authorized receiver station, wherein the asset allocation and asset monitoring apparatus comprises a filter module, where a lookup table in the filter module can be used to associate portfolio elements in a memory unit with one another and, on the basis of the associated portfolio elements, the filter module can be used to select data from the protected databases periodically within a definable time window and to transmit them to the control signal apparatus, wherein a weighting module can be used to associate the transmitted data with the portfolio elements of the lookup table in weighted fashion on the basis of variable weighting parameters, the weighting parameters being generated at least on the basis of filtered and selected market sum value parameters for the respective portfolio element, wherein an index module comprises at least one first, second and third incrementable memory stack, where the first memory stack comprises a filtered market value factor, which market value factor can be incremented periodically by means of a determinable first stack factor, where the second memory stack comprises a filtered first return factor which is weighted by means of the market value factor, which first return factor can be incremented periodically by means of a determinable second stack factor on the basis of coupon sum values, and where the third memory stack comprises a filtered second return factor which is weighted by means of the market value factor, which second return factor can be incremented periodically by means of a determinable second stack factor on the basis of periodically detected quoted sum values of the portfolio elements, and wherein the control signal apparatus can be used to generate the electronic control signals and/or control data on the basis of the unidirectionally filtered first, second and third memory stack values and to transmit them to the at least one authorized receiver station. The control signal data can be graphically displayed on the receiver station, with the graphical display being periodically corrected perspectively in line with the control signal data. The reception stations may interact with or be coupled to the asset allocation and asset monitoring apparatus on the basis of the graphical correction of the control signal data, for example. The index module may comprise a fourth memory stack, where the fourth memory stack comprises a filtered third return factor which is weighted by means of the market value factor and which can be increased on the basis of the cumulated first return factor and second return factor, and where the index module can be used to generate the electronic control signals and/or control data on the basis of the unidirectionally filtered first, second, third and fourth memory stack values and to transmit them to the at least one authorized receiver station. For the unidirectional filtering of the first, second and third memory stack values the asset allocation and asset monitoring apparatus may comprise an interface module for the access-controlled transfer of the memory stack values. The portfolio elements may comprise definable parameters for catastrophe bonds. The market value factor may comprise the market sum value of a portfolio element on the basis of a definable starting time value. The third return factor may comprise a sum value for the total profit from all portfolio elements. The receiver station can be used to receive access-controlled, electronic control signals and/or control data by transferring access request data to a conditional access server via a network, and the conditional access server can be used to transfer access authorization data on the basis of the access request data to the respective receiver station via the network. Charging data can be transmitted to a transaction server via a network for the purpose of charging for the service used in receiving the electronic control signals and/or control data. Chronological control signals and/or control data for each portfolio element may be provided in a separate history module up to a stipulatable time in the past for access using the reception stations. The control signal apparatus can be used to produce a unidirectional data stream, with reception stations being able to be used to take specific control signals and/or control data automatically from the data stream and to display them and/or store them. The data stream may be an encapsulated data package stream. The data stream may be a DAB/DVB data stream. This is not possible in this way with any system from the background art. In addition, this has, inter alia, the advantage that even automated multistage intervention apparatuses can be picked up and supported by means of the inventive system. However, a technical implementation based on quote sharing involves parallel stages, in contrast to hierarchically multistage systems from the background art, such as in the case of intervention apparatuses for malfunctions caused by catastrophes, such as floods, hurricanes, earthquakes and/or terrorist attacks. Such fully automated support for such systems has not been possible in this manner in the background art to date. Similarly, such fully automated management of portfolio elements with the technical implementations was not known in the background art. In addition, reliably and fully automatically produced control signals, e.g. for the technical implementation of automated portfolio management on the basis of appropriate cat bond indexes, for example, have the advantage that the cat bond market can become even more attractive to investors. Such systems which could meet the demands for security and reliability are not known in the background art to date. The electronic control signals and/or control data generated by means of the control signal apparatus, for example for the purpose of fully automated portfolio management, do not have these drawbacks.

In one variant embodiment, the intervention apparatus comprises a first reading module for generating a first stack height signal in line with the present stack height of the first incremented stack, the first stack height signal being able to be taken as a basis for additionally incrementing the first incrementable stack using a first adder module. Similarly, the intervention apparatus may comprise, by way of example, a second reading module for generating a second stack height signal in line with the present stack height of the second incremented stack, the second stack height signal being able to be taken as a basis for additionally incrementing the second incrementable stack using a second adder module. This variant embodiment has, inter alia, the advantage that the periodically picked up incrementation parameter can be optimized without the possibility of influencing the dependability of the inventive apparatus.

In another embodiment, the first reading module comprises means for realtime generation of the first stack height signal. By way of example, the intervention apparatus may also comprise a timer unit, with the first stack height signal being able to be produced periodically within a definable time window. Like the first, the second reading module may comprise means for realtime generation of the first stack height signal. The intervention apparatus may also comprise a timer unit, for example, with the second stack height signal being able to be produced periodically within a definable time window. This variant embodiment has, inter alia, the advantage that the incrementation parameters can be dynamically adjusted in realtime without the possibility of influencing the dependability of the inventive apparatus.

In a further embodiment, the intervention apparatus may comprise a network interface, with the network interface being able to be used to access at least one local database with associated stock-market or financial-institute parameters. This variant embodiment has, inter alia, the advantage that in the case of an at least partly cash-value-based implementation the intervention apparatus can implement the operational protection fully automatically. Similarly, the intervention apparatus may in this case be used to pick up fluctuations by financial parameters fully automatically and to allow for them in the operational protection.

In yet another embodiment, the second protected memory unit comprises a memory area which is separate from the incrementable stack, the lookup table being able to be used to associate protected parts of the incrementable stack with the separate stack. This variant embodiment has, inter alia, the advantage that the value parameters are associated with the respective identification data by means of the lookup table not exclusively on the basis of the first and second stacks, but rather the user is guaranteed a minimum association by the intervention apparatus.

In still another embodiment, the automated intervention apparatus is unidirectionally or bidirectionally connected to the one or more operational apparatuses by means of a monitoring and/or alarm apparatus for the purpose of automated emergency intervention in the event of malfunctions in the one or more transport means. By way of example, the pickup apparatus may comprise a position-finding module which can be used to generate location coordinate parameters for the location of the operational apparatus and to transmit them to the monitoring and/or alarm apparatus of the one or more operational apparatuses and to the intervention apparatus by means of the monitoring and/or alarm apparatus. On the one hand, this variant embodiment has, inter alia, the advantage that, by way of example, the incrementation parameters can be adapted in realtime and/or periodically by means of the intervention apparatus. On the other hand, this variant embodiment also has the advantage that operational interventions and/or alarm signals and/or control/monitoring signals can be adapted to suit the relevant intervention event or operational apparatus and/or can be initiated by the automated intervention apparatus in purposeful and likewise optimized fashion.

In another embodiment, the intervention apparatus comprises, in addition to the second protected memory unit with the second incrementable stack, at least one submodule which is associated with different intervention classes and/or risk classes, where, upon reaching different determinable threshold values for counters, the lookup table can be used to associate value parameters with the respective identification data on the basis of the first and second stacks, and said value parameters can be transferred by means of the intervention apparatus to at least one network unit via an interface module. The submodules may be associated such that, by way of example, they can be altered by the second memory unit, in particular can be altered dynamically as an embodiment based on a user profile. This variant embodiment has, inter alia, the advantage that graded transmission of the value parameters, e.g. for crediting cash sum values, can be associated on the basis of the second memory unit and can be transmitted to a clearing module, for example, if the second memory unit comprises value parameters after the time interval has elapsed.

The present invention relates not only to the inventive method but also to a system for carrying out this method and to an appropriate computer-readable medium that has computer instruction stored thereon that are configured to perform such method when executed on a computer.

Variant embodiments of the present invention are described below with the aid of examples. The examples of the embodiments are illustrated by the following appended figures.

BRIEF DESCRIPTION OF THE DRAWINGS

These and other features, aspects and advantages of the present invention will become better understood with regard to the following description, appended claims and accompanying drawings. The reference numerals used through the figures are the asset allocation and asset monitoring apparatus 10, filter module 20, look-up table 21, memory unit 22, weighting module 23, index module 30, first memory stack 31, market value factor 311, second memory stack 32, first return factor 321, third memory stack 33, second return factor 331, protected databases 40, 41, 42, and 43, network 50, control signal apparatus 60, receiver stations 70, 71, 72, 73 and 74.

DETAILED DESCRIPTION OF THE INVENTION

Figure 1:
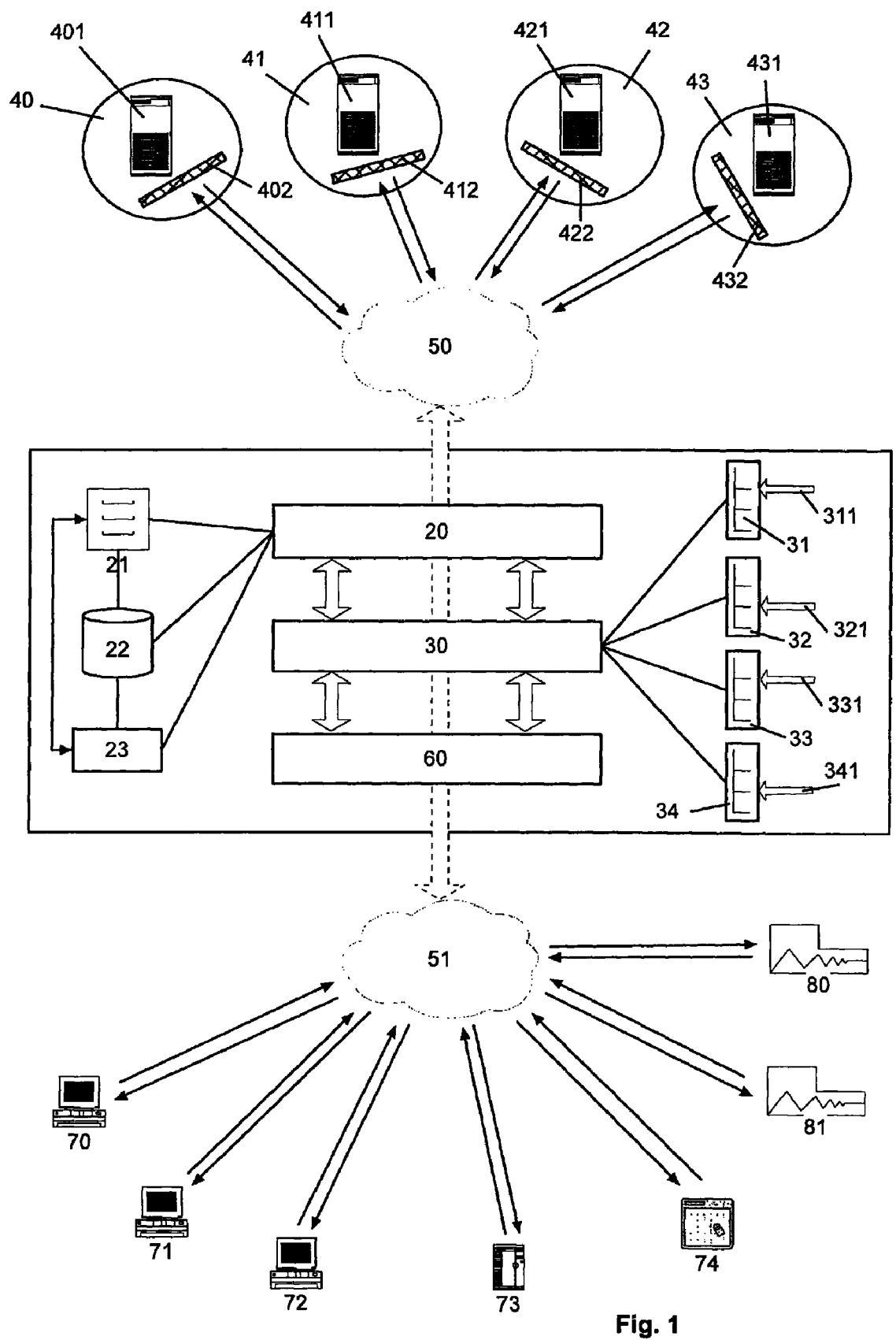
FIG. 1 shows a block diagram which schematically shows an exemplary embodiment of an inventive fully automated, computer-aided asset allocation and asset monitoring apparatus 10 comprising a unidirectional, data-protected control signal apparatus 60, in which data from locally arranged, protected databases 40, . . . , 43 can be transferred via a network 50 to the asset allocation and asset monitoring apparatus 10 and can be evaluated and in which electronic control signals and/or control data can be transmitted to at least one authorized receiver station 70, . . . , 74.
Figure 2:
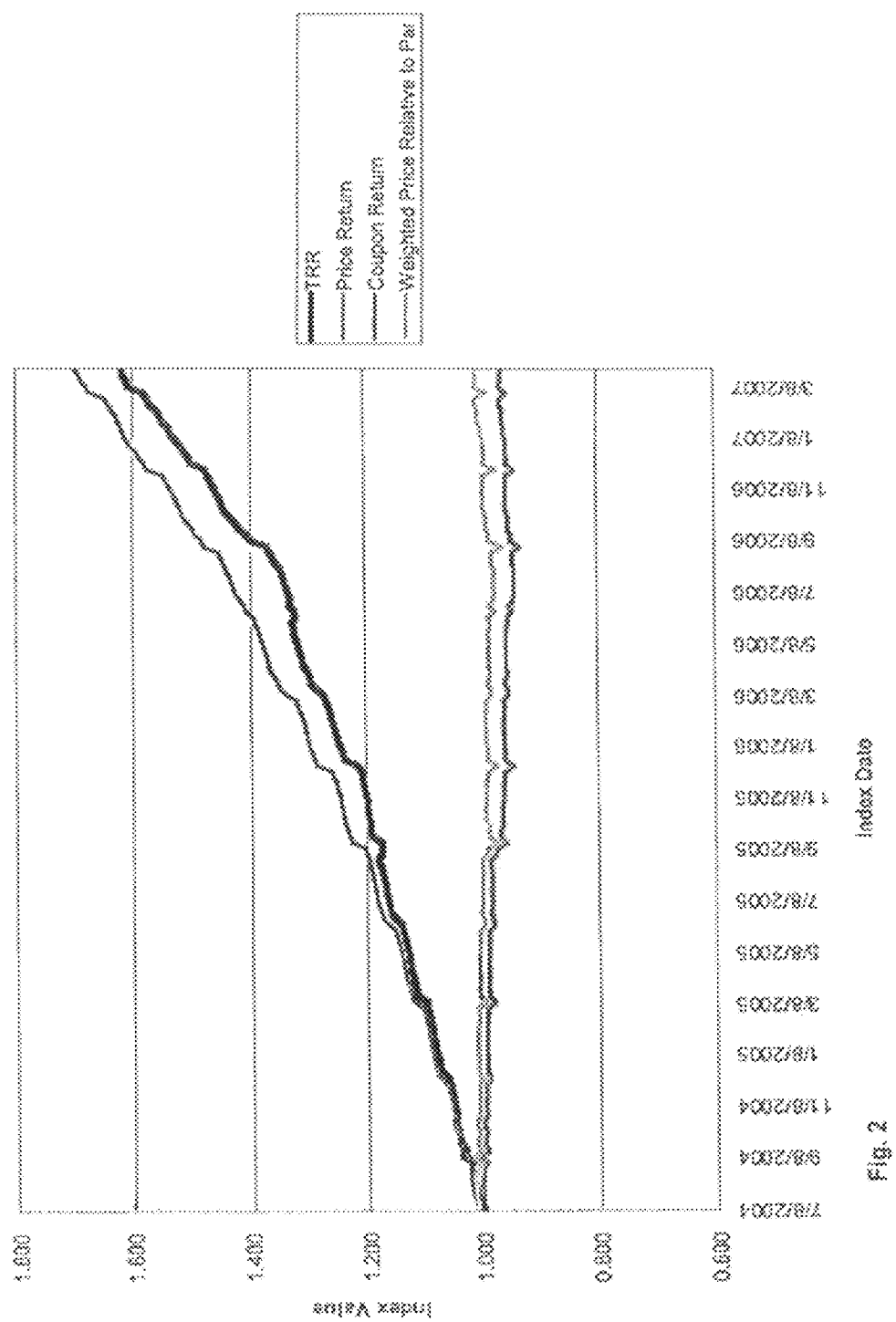
FIGS. 2 and 5 show a block diagram which schematically illustrates the weighted trend of cat bonds using the example of US cat bonds. The reference "TRR" sets the parameters for the total yield, the reference "Price Return" sets the parameters for the yield based on the stock-market price of the cat bond, the reference "Coupon Return" sets the parameters for the yield based on the borrowing rate and the reference "Weighted Price Relative to Par" gives the trend of the price weighted with the market value. The x axis ("Index Date") is the time axis and the y axis ("Index Value") corresponds to the index value of the portfolio element, i.e. in this case the cat bonds.
Figure 3:
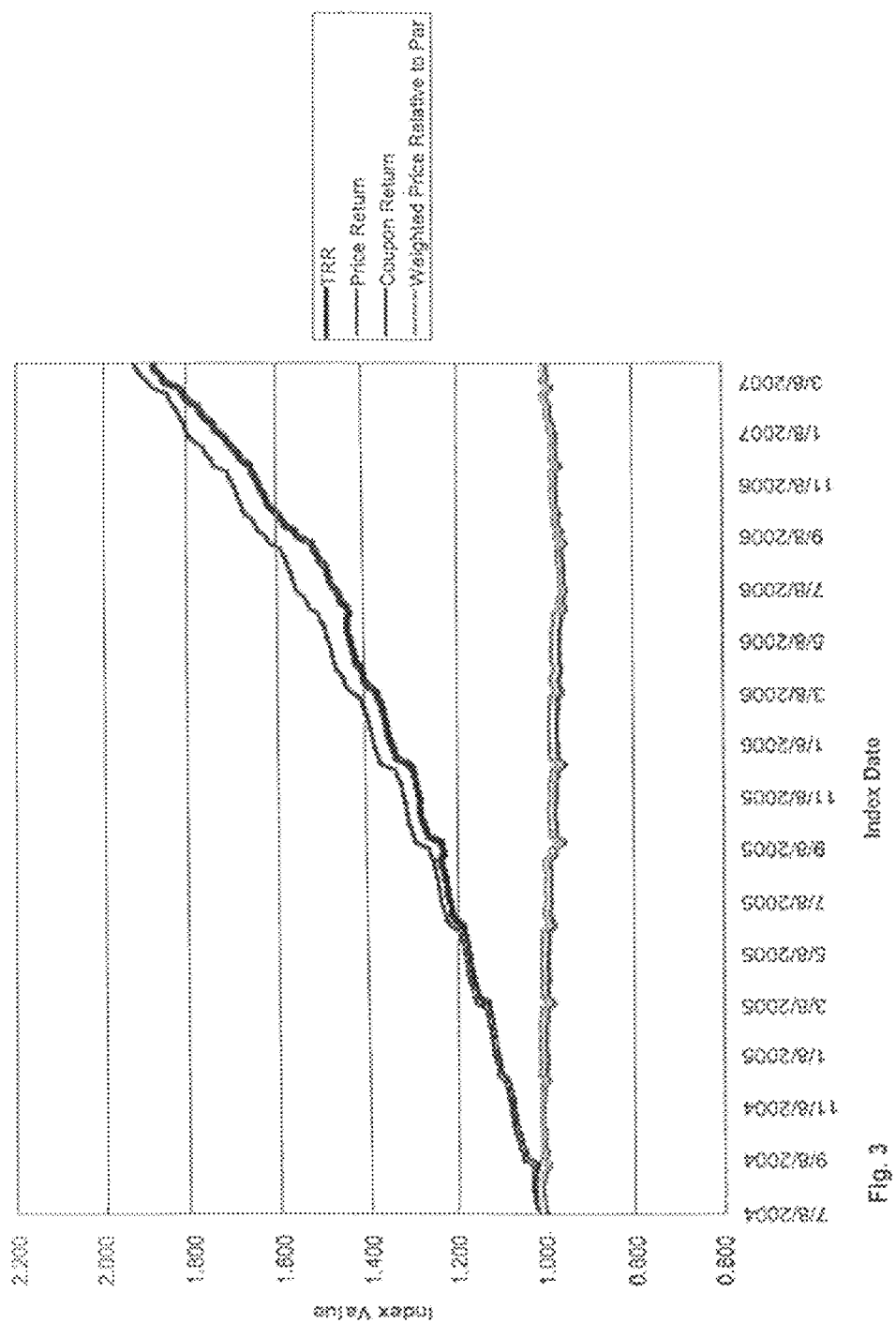
FIG. 3 schematically shows the weighted trend of cat bond parameters relating to Californian earthquakes using the example of US cat bonds. The reference "TRR" again sets the parameters for the total yield, the reference "Price Return" sets the parameters for the yield based on the stock-market price of the cat bond, the reference "Coupon Return" sets the parameters for the yield based on the borrowing rate and the reference "Weighted Price Relative to Par" gives the trend of the price weighted with the market value. The x axis ("Index Date") is the time axis and the y axis ("Index Value") corresponds to the index value of the portfolio element, i.e. in this case the cat bonds.
Figure 4:
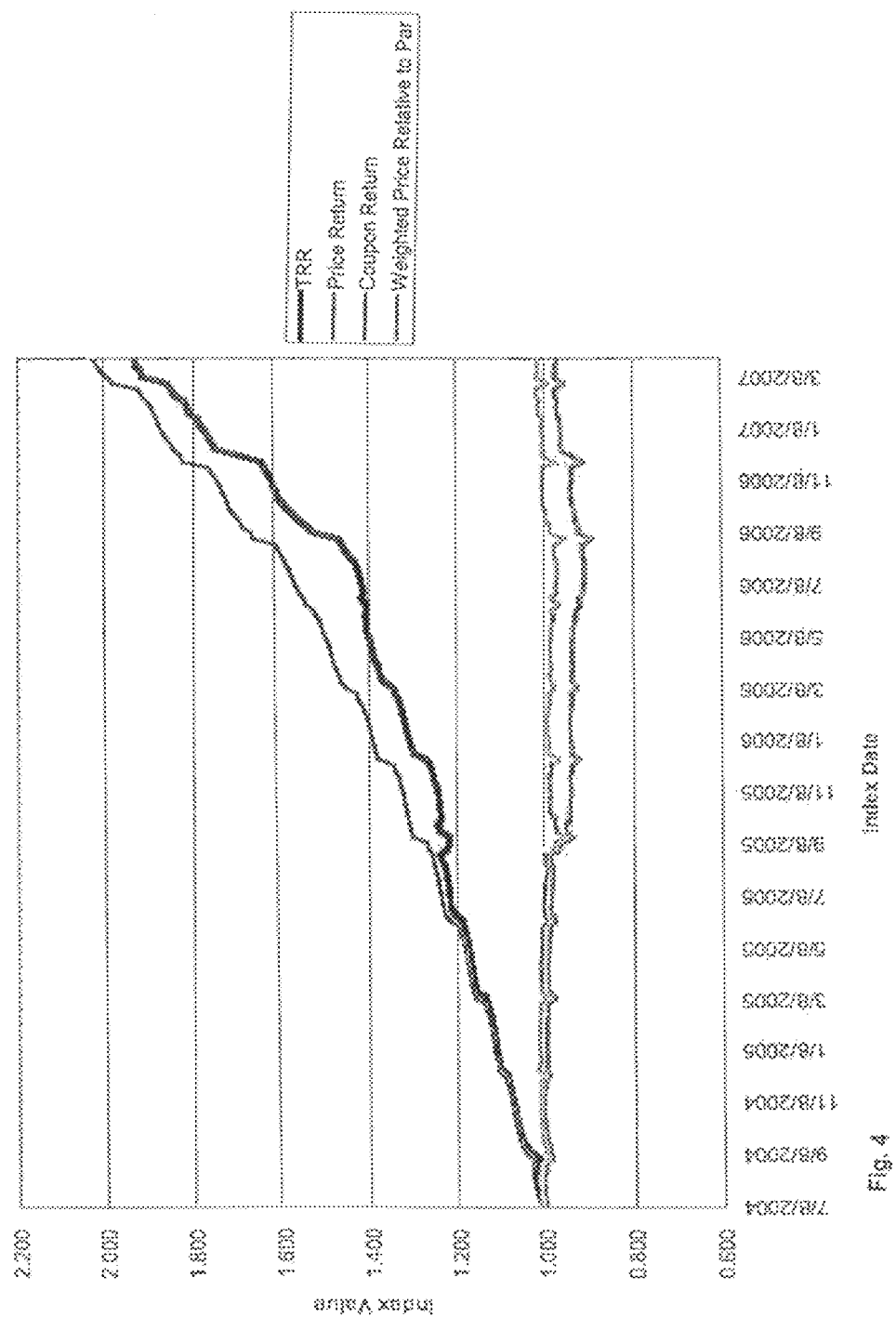
FIG. 4 schematically shows the weighted trend of cat bonds relating to wind events using the example of US cat bonds. The reference "TRR" sets the parameters for the total yield, the reference "Price Return" sets the parameters for the yield based on the stock-market price of the cat bond, the reference "Coupon Return" sets the parameters for the yield based on the borrowing rate and the reference "Weighted Price Relative to Par" gives the trend of the price weighted with the market value. The x axis ("Index Date") is the time axis and the y axis ("Index Value") corresponds to the index value of the portfolio element, i.e. in this case the cat bonds.
Figure 5:
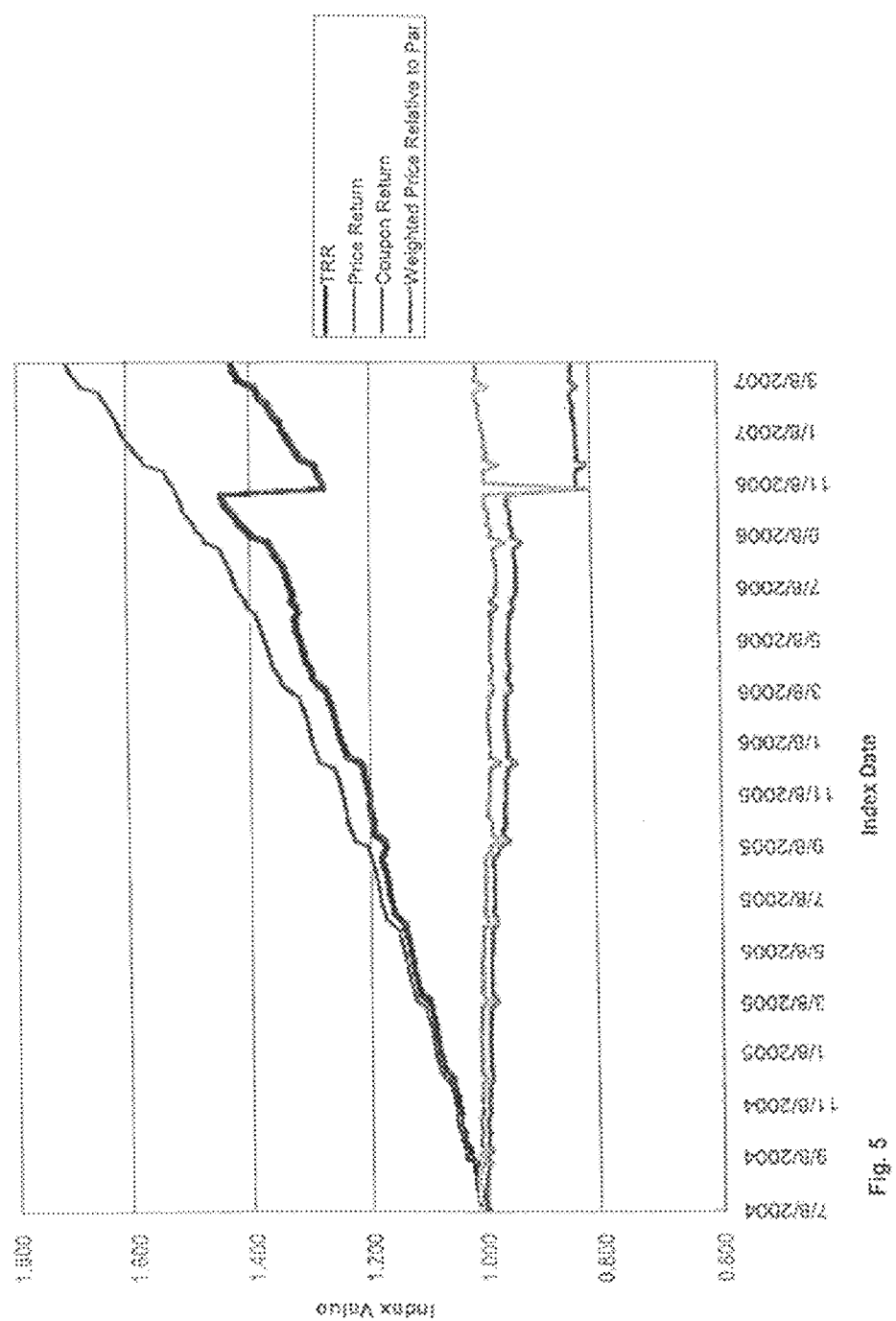
Figure 6:
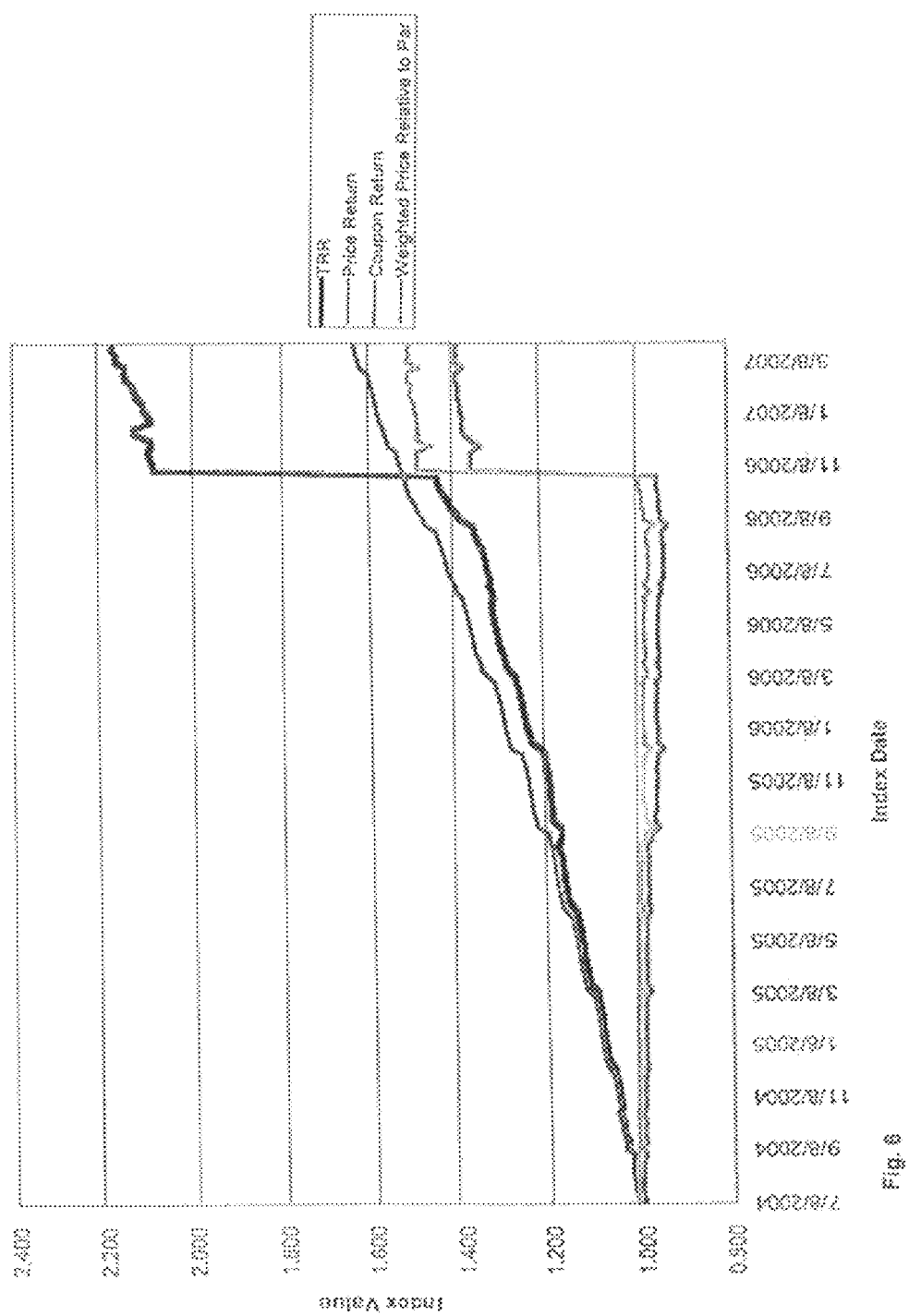
FIG. 6 schematically shows the alteration in the stock-market parameters weighted using the market value in 2006. The reference "TRR" sets the parameters for the total yield, the reference "Price Return" sets the parameters for the yield based on the stock-market price of the cat bond, the reference "Coupon Return" sets the parameters for the yield based on the borrowing rate and the reference "Weighted Price Relative to Par" gives the trend of the price weighted with the market value. The x axis ("Index Date") is the time axis and the y axis ("Index Value") corresponds to the index value of the portfolio element, i.e. in this case the cat bonds.
Figure 7:
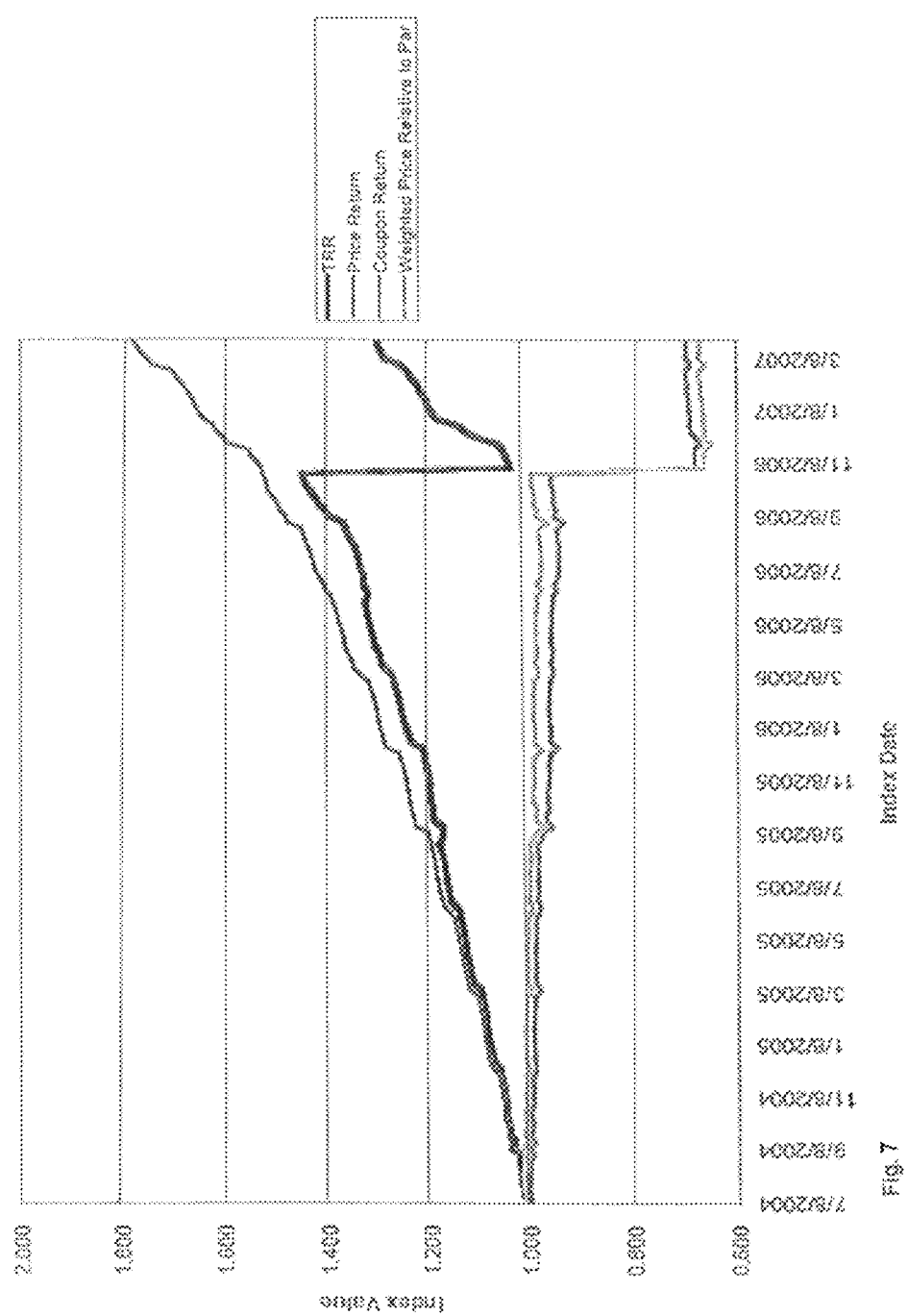
FIG. 7 schematically shows the alteration in the cat bonds parameters weighted using the market value in 2006 using the example of US cat bonds. The reference "TRR" sets the parameters for the total yield, the reference "Price Return" sets the parameters for the yield based on the stock-market price of the cat bond, the reference "Coupon Return" sets the parameters for the yield based on the borrowing rate and the reference "Weighted Price Relative to Par" gives the trend of the price weighted with the market value. The x axis ("Index Date") is the time axis and the y axis ("Index Value") corresponds to the index value of the portfolio element, i.e. in this case the cat bonds.

FIG. 1 illustrates an architecture which can be used to implement the invention. In this exemplary embodiment, the computer-aided asset allocation and asset monitoring apparatus 10 comprises a unidirectional, data-protected control signal apparatus 60. Data from locally arranged, protected databases 40, 41, 42, 43 are transferred via a network 50 to the asset allocation and asset monitoring apparatus 10. The data may also comprise programs or program procedures. Data are to be understood to mean, inter alia, multimedia data, such as digital data like texts, graphics, images, maps, animations, moving images, video, Quicktime, sound records, programs (software), program-accompanying data and hyperlinks or references to multimedia data. These also include, by way of example, MPx (MP3) or MPEGx (MPEG4 or 7) standards, as are defined by the Moving Picture Experts Group. The data may also comprise metadata, for example. The metadata can be extracted using content-based index technology and may comprise headwords, synonyms, references to multimedia data (e.g. including hyperlinks), picture and/or sound sequences etc. Such systems are known in a wide variety of variations in the background art. Examples of these are U.S. Pat. No. 5,414,644, which describes a three-file indexing technique, or U.S. Pat. No. 5,210,868, which additionally also stores synonyms as search keywords when indexing the multimedia data and extracting the metadata. In the present exemplary embodiment, the metadata may also, at least in part, be produced dynamically (in realtime) on the basis of operational and/or profile parameters of the asset allocation and asset monitoring apparatus 10. The data may be stored so that the asset allocation and asset monitoring apparatus 10 can access them at different locations in different networks 50 or locally. The latter networks 50 may, as mentioned, comprise a LAN (Local Area Network) or a WAN (Wide Area Network), the Internet, broadcast cable networks, PSTN, PLMN or the like, for example. The communication via the network 50 can take place, by way of example, using special short messages, e.g. SMS (Short Message Services), USSD (Unstructured Supplementary Services Data) messages or other techniques, such as MExE (Mobile Execution Environment), GPRS (Generalized Packet Radio Service), HSCSD (High Speed Circuit Switched Data) data services, WAP (Wireless Application Protocol) or UMTS (Universal Mobile Telecommunication System), or using a useful channel. Naturally, the communication may also be implemented using normal IP (Internet Protocol) protocols.

The control signal apparatus 60 is used to transmit electronic control signals and/or control data to at least one authorized receiver station 70, 71, 72, 73, 74. The asset allocation and asset monitoring apparatus 10 comprises a filter module 20. A lookup table 21 in the filter module 20 is used to associate portfolio elements in a memory unit 22 with one another. By way of example, the portfolio elements may comprise definable parameters for the catastrophe bonds, cat bonds, already described, but quite generally parameters and/or stock-market data pertaining to securities from various and/or a plurality of financial centers or corresponding index values. Based on the associated portfolio elements, the filter module 20 is used to select data from the protected databases 40, 41, 42, 43 periodically within a definable time window and to transmit them to the control signal apparatus 60. A weighting module 23 is used to associate the transmitted data with the portfolio elements of the lookup table 21 in weighted fashion, on the basis of variable weighting parameters. Asset allocation and asset monitoring apparatuses 10 are used to select and/or filter portfolio-element-specific data from the associated data, for example, on the basis of which market sum value parameters of the portfolio elements are generated. The market sum value parameters comprise at least the current market value of the portfolio element for a particular time t. The weighting parameters are generated at least on the basis of filtered and selected market sum value parameters of the respective portfolio element.

An index module 30 comprises at least a first, second and third incrementable memory stack 31, 32, 33. As mentioned, the market sum value parameters comprise at least the current market value of the portfolio element for a particular time t. The current market value of a portfolio element is filtered by means of the asset allocation and asset monitoring apparatus 10 as a market value factor 311 on the basis of the lookup table 21. The market value factor 311 can comprise at least the market sum value of a portfolio element based on a definable starting time value. The first memory stack 31 is assigned the filtered market value factor 311. The market value factor 311 of the first memory stack 31 is then periodically incremented by means of a determinable first stack factor. The second memory stack 32 comprises a filtered first return factor 321 which is weighted by means of the market value factor 311. The first return factor 321 comprises at least a yield sum value in line with a determinable borrowing rate factor. The first return factor 21 is periodically incremented by means of a determinable second stack factor on the basis of the borrowing rate factor, i.e. the coupon sum values. The third memory stack 33 comprises a filtered second return factor 331 which is weighted by means of the market value factor 311. The second return factor 321 comprises at least a quoted sum value for at least one financial institute or corresponding stock-market parameters. The quoted sum value can typically comprise the current price of a portfolio element on the basis of time t. Coding parameters may be additionally determinable for selection or filtering. The second return factor 331 is periodically incremented by means of a determinable second stack factor on the basis of periodically detected quoted sum values for the portfolio elements. The index module 30 can therefore be implemented, by way of example, on the basis of the known Lehman index technology (e.g. see "Global Family of Indices"). This has not been possible in this way with the background art to date. The parameters of the index module 30 can be aligned or re-equalized or balanced periodically, for example, such as on a weekly or monthly basis etc. The return parameters are then fed back as a reinvestment.

The control signal apparatus 20 is used to generate the electronic control signals and/or control data on the basis of the unidirectionally filtered first, second and third memory stack values 311, 321, 331 and to transmit them to the at least one authorized receiver station 70, 71, 72, 73, 74. The control signal data can be transmitted as data which can be graphically displayed on the receiver station 70, 71, 72, 73, 74, the graphical display being periodically corrected perspectively in line with the control signal data, and the receiver station interacting and/or being controlled on the basis of the graphical corrections in the control signal data using the asset allocation and asset monitoring apparatus 10. For the purpose of unidirectional filtering of the first, second and third memory stack values, the asset allocation and asset monitoring apparatus 10 may comprise, by way of example, an interface module 30 having means for access-controlled transfer of the memory stack values 301, 311, 321, 331, 341. Reliable automated control signals for portfolio management on the basis of appropriate cat bond indexes, for example, have the advantage that the cat bond market can become even more attractive to investors. Such systems which could meet the demands for security and reliability are not known in the background art to date. The electronic control signals and/or control data generated by means of the control signal apparatus 20, for example for the purpose of fully automated portfolio management, do not have these drawbacks. The quoted sum value as the yield based on the changes in prices ("Price Return") and the total yield ("Total Rate of Return") can be restricted to cat bonds, denominated on the basis of US dollars, as one variant embodiment, for example. The filter module 20 then additionally comprises corresponding filter parameters and/or selection parameters. In this variant embodiment, the lookup table 21 may be divided into three main regions, with a first subregion of the lookup table 21 comprising all the cat bonds denominated on the basis of USD, a second subregion comprising all the cat bonds based on individual risk through wind events, and a third subregion comprising cat bonds based on individual risk through Californian earthquake catastrophes. The incrementations in the index module 30 can be made periodically or upon request. With a periodic increment, the time window value can be set to once a week or month, for example. The time window should be chosen such that the values remain consistent for the method used. This has the advantage that the control signals remain transparent to the investor, for example, and confidence in the automated method rises. It is thus possible to attract further investors and to increase the liquidity of the secondary market. By way of example, division into the aforementioned three asset classes by means of the lookup table 21, for example into US wind and Californian earthquakes, and not into statistically improbable events, has the advantage, inter alia, that more information about the individual event can be taken from the control signals. The automated control signals thus also provide the investors with new ways of providing security for derivative-based natural catastrophe risks.

As mentioned, the lookup table 21 or the described subregions of the lookup table 21 are weighted with the current quoted sum value of the individual portfolio elements, such as cat bonds, at the start of the automated method. The lookup table 21 or its subregions can be updated or re-balanced by means of the weighting module 23, for example periodically or upon request. In one exemplary embodiment, the time window value chosen for the update may be a week or a month, for example. Portfolio elements, e.g. cat bonds, with a due date or expiry date which is less than the defined time window value (for example a week in the exemplary embodiment above) can be extracted from the lookup table 21. As mentioned, the portfolio elements can be filtered on a currency-specific basis, for example all portfolio elements denominated on the basis of USD. The market value factor 311, the first return factor 321 and the second return factor 331 as memory stack values for the memory stacks 31/32/33 are cumulative values. This means that the unidirectional action of the apparatus can be assured. In line with the method, the market value factor comprises the market value of the portfolio element and also the cumulated stack factors on the basis of accrued interest, for example. While the return factors 321/331 can be integrated into the control signal as a yield value, for example at the end of each time period, the market value factor 311 can actually be generated at the start of a time period, for example. This means that the market value factor 311 may comprise the following parameters, for example:

$$\text{Market Value}_{Beginning\ Period} = (\text{Price}_{Beginning\ Period} + \text{Accrued Interest}_{Beginning\ Period})$$

The first return factor 321, for example as a coupon return or as a borrowing rate value, may comprise the following parameters, for example:

$$\text{Coupon Return} = [(\text{Accrued Interest}_{Index\ Date} - \text{Accrued Interest}_{Beginning\ Period})]/\text{Market Value}_{Beginning\ Period}$$

The second return factor 321, for example as price return or current quoted value, may comprise the following parameters, for example:

$$\text{Weekly Price Return} = (\text{Price}_{Index\ Date} - \text{Price}_{Beginning\ Period})/\text{Market Value}_{Beginning\ Period}$$

And finally, the memory stack value 341 quoted further below, as the Total Rate of Return, e.g. in line with the total profit sum, may comprise the following parameters, for example:

$$\text{Total Rate of Return} = \text{Coupon Return} + \text{Price Return}$$

The index module 30 may additionally comprise a fourth memory stack 33. The fourth memory stack 33 comprises a filtered third return factor 331 weighted by means of the market value factor 311. The third return factor 331 is increased periodically or upon request on the basis of the cumulated first return factor 321 and second return factor 331. The third return factor 341 may comprise at least the sum value for the total price difference for all portfolio elements. The index module 30 is accordingly used to generate the electronic control signals and/or control data on the basis of the unidirectionally filtered first, second, third and fourth memory stack values 301, 311, 321, 331, 341 and to allow them to be transmitted to the at least one authorized receiver station 70, 71, 72, 73, 74. By way of example, the receiver station 70, 71, 72, 73, 74 may be a PC (personal computer), TV, PDA (Personal Digital Assistant) or a mobile radio (particularly in combination with a broadcast receiver, for example). The asset allocation and asset monitoring apparatus 10 may comprise an appropriate reception station profile for a receiver station 70, 71, 72, 73, 74. The reception station profile can comprise information about a receiver station 70, 71, 72, 73, 74, such as location of the receiver station 70, 71, 72, 73, 74 in the network, identity of the user or of the receiver station 70, 71, 72, 73, 74, receiver-station-specific network properties, receiver-station-specific hardware properties, data regarding the user behavior on the receiver station 70, 71, 72, 73, 74, etc. The receiver station 70, 71, 72, 73, 74 can, or the receiver station 70, 71, 72, 73, 74, can be used to, stipulate and/or modify at least portions of reception station data from the reception station profile beforehand for the purpose of coupling to the asset allocation and asset monitoring apparatus 10 or beforehand for the purpose of obtaining control signal data. The rest of the data in the reception station profile can be determined automatically by the asset allocation and asset monitoring apparatus 10, by authorized third parties or likewise by the user. Thus, the asset allocation and asset monitoring apparatus 10 may comprise automatic connection recognition, reception-station or user identification and/or automatic recording and evaluation of the reception-station or user behavior (time of transmission or of access, frequency of access etc.), for example. These data regarding reception-station behavior may then in turn be modifiable by means of the reception station 70, 71, 72, 73, 74 in one variant embodiment.

The control signal data can be optimized (e.g. compressed, sequenced, picture resolution or sound quality reduced etc.) in line with the reception station profile, e.g. the user-specific hardware properties or the network properties of the network 51. In one variant embodiment, the reception station 70, 71, 72, 73, 74 can be used to stipulate access request data before the coupling or the transmission authorization of the control signal data from the asset allocation and asset monitoring apparatus 10 to a reception station 70, 71, 72, 73, 74 in the reception station profile. The access request data may comprise, by way of example, time, date, type, name, general descriptions (e.g. including synonyms) and/or properties such as resolution etc. for the desired control signal data, i.e. may perform a technical filter function. Thus, at the time of access by a reception station 70, 71, 72, 73, 74, the control signal data optimized on a reception-station-specific basis have already been provided. The fact that the data from the reception station profile are not only determined, for example in terms of image resolution etc., by the asset allocation and asset monitoring apparatus 10 but rather can be modified at least in part by means of the reception station 70, 71, 72, 73, 74 (e.g. access request data) means that it is also possible to take account of specific reception station conditions (e.g. in terms of download times) for the optimization.

In one embodiment option, the reception station profile may comprise a credit limit. The credit limit is a cash sum value which can be defined for a user and/or the asset allocation and asset monitoring apparatus 10 and/or authorized third parties (e.g. banks, credit card companies, multimedia data providers etc.) and it stipulates a maximum cash sum value for control signal data, up to which cash sum value the asset allocation and asset monitoring apparatus 10 can perform automatic billing for obtaining control signal data. When the credit limit is exceeded, the asset allocation and asset monitoring apparatus 10 makes a request to a bank institute regarding the creditworthiness of the user of the reception station 70, 71, 72, 73, 74, for example. The credit limit may also be used by a user to protect himself against unforeseen costs for obtaining the multimedia data. The handling and management of the billing and/or the access keys are performed by the asset allocation and asset monitoring apparatus 10. The decoding and/or decryption of the access-controlled control signal data can be achieved by means of an access control module, for example, with a distribution key and/or session key based on the ETSI standard being able to be used, for example. The access control module may be implemented in hardware or in software, for example, like the asset allocation and asset monitoring apparatus 10 based on the invention. For billing for the control signal data obtained, i.e. billing for obtaining the data, the asset allocation and asset monitoring apparatus 10 can generate appropriate billing data, for example, comprising billing records (e.g. electronically signed), for example, in similar fashion to CDRs (Call Data Records) in the case of what are known as DURs (DAB/DVB Usage Records). The billing records are transmitted by the asset allocation and asset monitoring apparatus 10 to a clearing module in a credit card company, for example, where they are handled further, or the central unit carries out the billing independently. The asset allocation and asset monitoring apparatus 10 can also be used to provide the control signal data with an electronic stamp, an electronic signature or an electronic watermark. The electronic signature allows the control signal data to be assigned to a reception station 70, 71, 72, 73, 74, which has obtained them from the asset allocation and asset monitoring apparatus 10, at any later time. This means that it is possible to prevent misuse of charge-incurring control signal data by a user. In particular the reception station profile may also comprise further-use condition data which can be stipulated by a user and/or the asset allocation and asset monitoring apparatus 10 and/or authorized third parties. As mentioned, it is thus possible to use the receiver station 70, 71, 72, 73, 74 for receiving access-controlled, electronic control signals and/or control data to transmit access request data to a conditional access server via a network 51 and to use the conditional access server to transmit access authorization data based on the access request data to the respective receiver station 70, 71, 72, 73, 74 via the network 51. Alternatively, the billing may simply be sent to a transaction server via the network 51 using billing data for billing for the service used in receiving the electronic control signals and/or control data.

A separate history module may also provide chronological control signals and/or control data for each portfolio element up to a stipulatable time in the past for transmission to one or more reception stations 70, 71, 72, 73, 74, for example. As one variant embodiment, the control signal apparatus 60 can also be used to produce a unidirectional data stream, for example. In this variant embodiment, the reception stations 70, 71, 72, 73, 74 include appropriate means for automatically taking specific control signals and/or control data from the data stream, which control signal data can be displayed and/or stored as above, for example. The data stream may be in the form of an encapsulated data package stream, for example. In particular, the data stream may be implemented as a DAB/DVB data stream.

Figure 8:
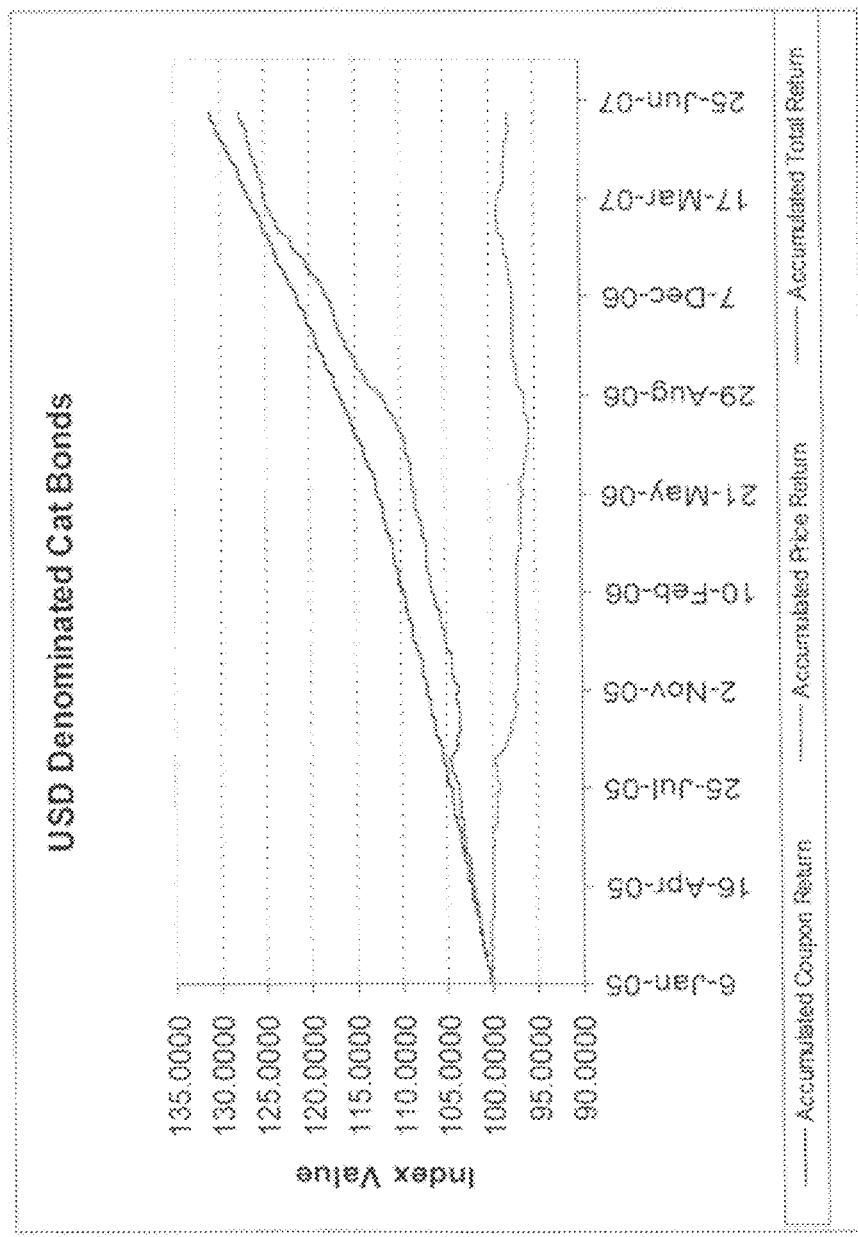
FIG. 8 likewise schematically shows a trend for cat bonds parameters using the example of the cat bonds denominated using US dollars. The reference "Accumulated Coupon Return" sets the parameters for the accumulated yield based on the borrowing rate, the reference "Accumulated Price Return" sets the parameters for the accumulated yield based on the stock-market price and the reference "Accumulated Total Return" sets the parameters for the accumulated yield based on the total yield. The x axis ("Index Date") is the time axis and the y axis ("Index Value") corresponds to the index value of the portfolio element, i.e. in this case the cat bonds.

In a cash-value-based embodiment example the unidirectionally filtered first, second and third memory stack values 311, 321, 331 can be at least partially related to an all USD denominated Cat Bonds Performance Index (see FIG. 8). Such a main index parameter can be tracking e.g. the aggregated performance of all USD denominated catastrophe bonds e.g. since a definable date as Jan. 1, 2005. The accumulative 1 year return since 15 Jun. 2006 totals 16.63%, up from 13.64% in 2006 and 5.21% in 2005. For example are in such a basket currently 67 catastrophe bonds. This number has remained relatively stable with the maximum number of bonds totaling 77 in May 2007. The minimum number of bonds in the basket was 56 in May 2005. The total notional of bonds has also increased significantly over the 2 year period. The basket had e.g. USD 3.05 billion of notional at the beginning of 2005, USD 4.22 billion year ending 2006 and currently has USD 6.75 billion in 2007. The basket of the example is not location specific and includes natural catastrophe exposures from the US, Europe, Japan, Mexico, and Australia. The basket includes all perils issued to date. The improvement in total return for the basket is primarily driven by the increase in issuance of bonds containing a higher expected loss. The increased exposure has resulted in an increase in coupon. The pronounced decline in Price Return (1 Sep. 2006) is largely due to the likely default of the parameter as a consequence of Hurricane Katrina on 25 Aug. 2006.

Figure 9:
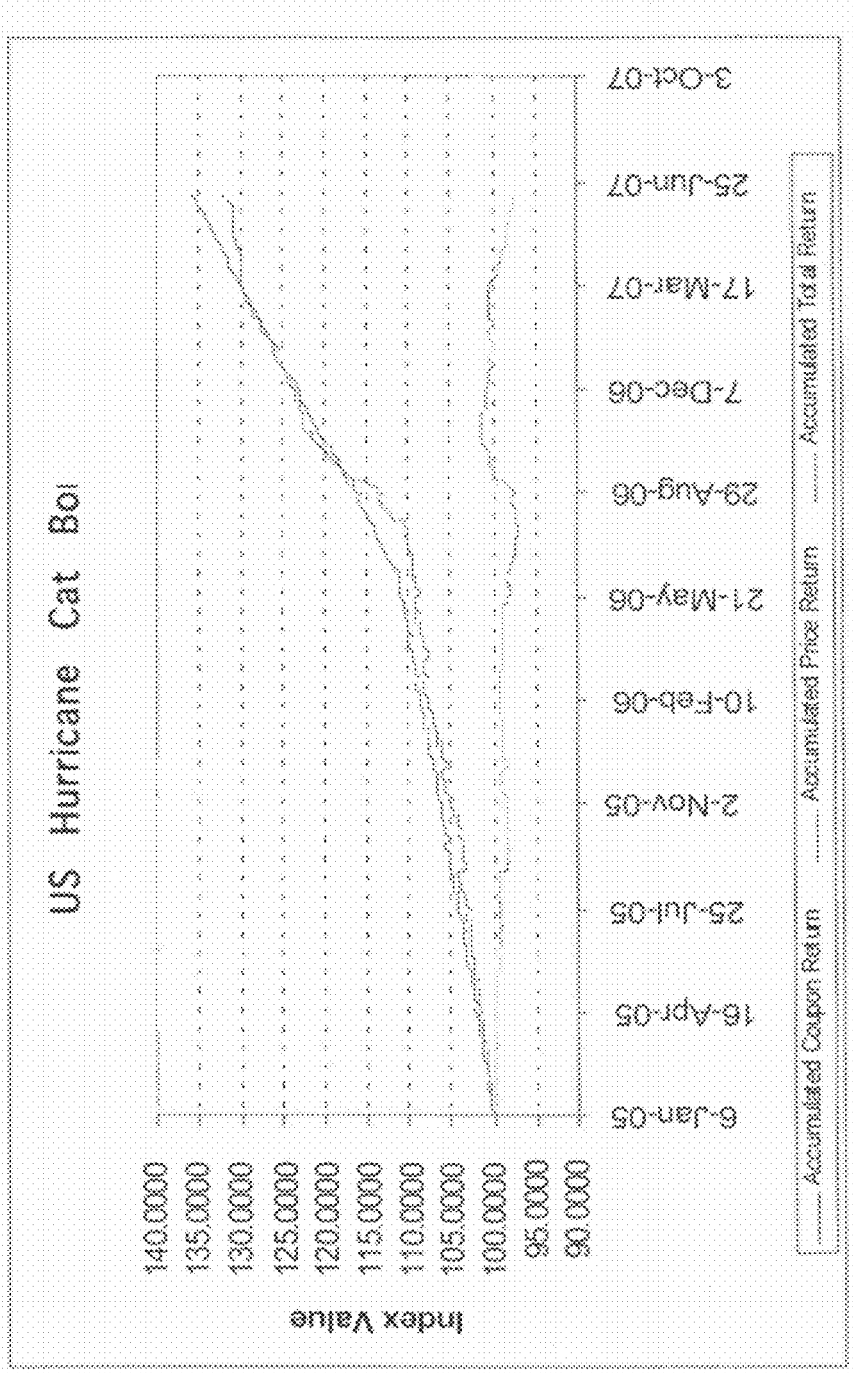
FIG. 9 schematically shows the trend of cat bond parameters relating to cyclone events using the example of US cat bonds. The reference "Accumulated Coupon Return" sets the parameters for the accumulated yield based on the borrowing rate, the reference "Accumulated Price Return" sets the parameters for the accumulated yield based on the stock-market price and the reference "Accumulated Total Return" sets the parameters for the accumulated yield based on the total yield. The x axis ("Index Date") is the time axis and the y axis ("Index Value") corresponds to the index value of the portfolio element, i.e. in this case the cat bonds.

In an other cash-value-based embodiment example the unidirectionally filtered first, second and third memory stack values 311, 321, 331 can be at least partially related to an all US Wind Single Peril Cat Bond Performance Index (see FIG. 9). Such an index parameter can capturing e.g. single peril US wind cat bonds only. In this example, the accumulative 1 year return since 15 Jun. 2006 totals 20.14%. Recent returns are up compared to the 2006 return of 17.42% and the 2005 return of 6.91%. It is important to note that there is significant US Wind exposure in multi-peril bonds. As expected, the number of bonds in the basket can grown during the two year period. The basket currently totals 14 single peril bonds. The basket totaled just 7 bonds during the period of May 2005 to May 2006. Notional amount has increased dramatically in recent years, in this example the basket had USD 655 million at inception, and totals $1.235 billion. In this embodiment example, the cyclical nature of the Price Return is evident due to the US hurricane season.

Figure 10:
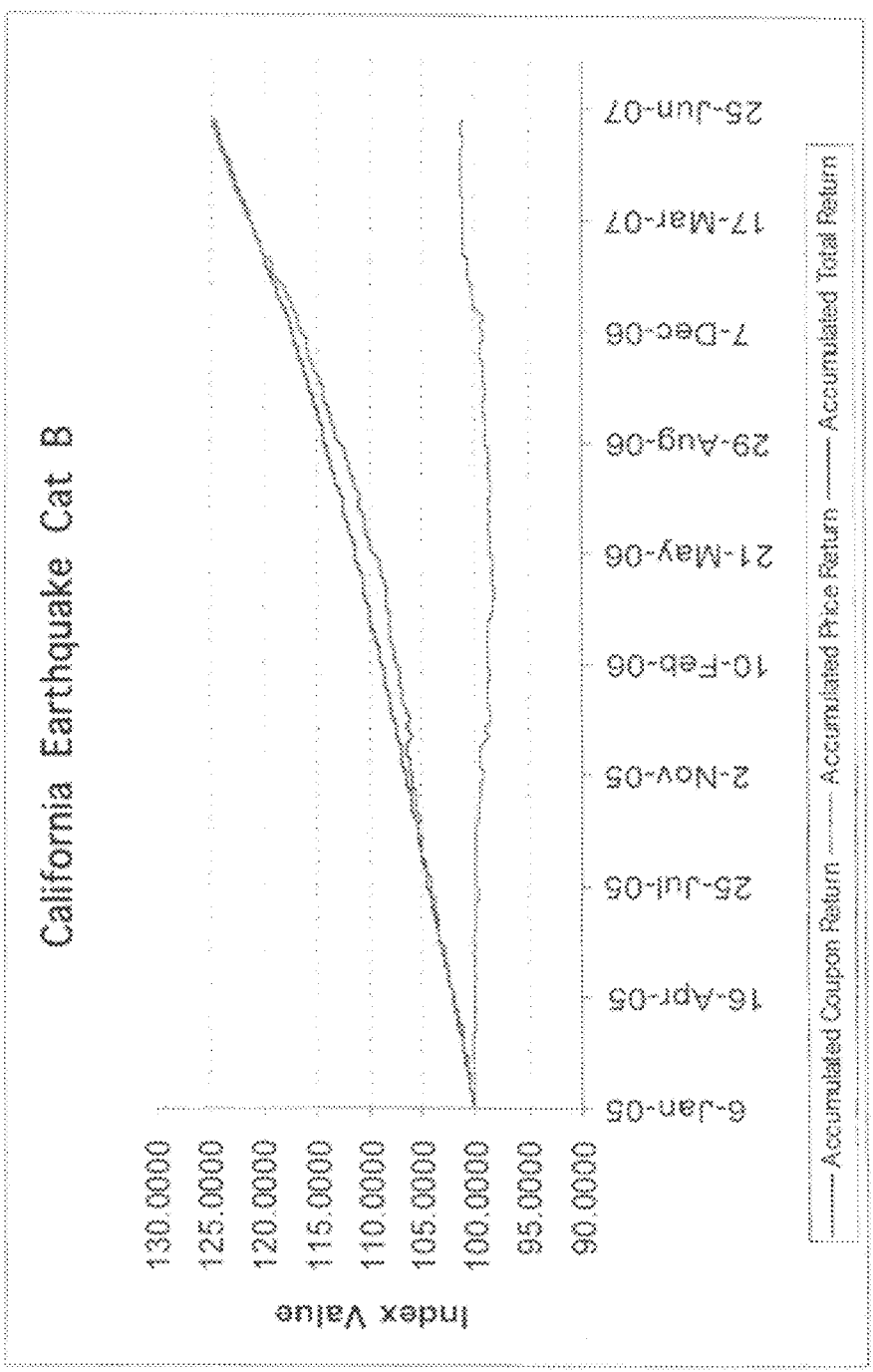
FIG. 10 schematically shows the trend of cat bond parameters relating to Californian earthquakes using the example of category B US cat bonds. The reference "Accumulated Coupon Return" sets the parameters for the accumulated yield based on the borrowing rate, the reference "Accumulated Price Return" sets the parameters for the accumulated yield based on the stock-market price and the reference "Accumulated Total Return" sets the parameters for the accumulated yield based on the total yield. The x axis ("Index Date") is the time axis and the y axis ("Index Value") corresponds to the index value of the portfolio element, i.e. in this case the cat bonds.

In an even other cash-value-based embodiment example the unidirectionally filtered first, second and third memory stack values 311, 321, 331 can be at least partially related to an all Single Peril California Earthquake Cat Bonds (see FIG. 10). Such an index parameter can capturing. Such a California earthquake index parameter is tracking all single peril bonds. Due to the absence of major earthquakes in California, the returns is in this example positive with an annual accumulative return for the year since 14 Jun. 2006 totaling 12.68%. This compares to 10.18% year ending 2006 and 6.35% year ending 2005. Whilst California Earthquake risk is a major exposure for the ILS market, there are in the example few single peril bonds. The current count is just 5 bonds, whilst at inception the basket total 9 bonds. The current notional totals USD 397 million. Earthquakes are very well defined events and depending on the size of the event, it is probable that one earthquake will trigger the vast majority of bonds.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A computer-aided asset allocation and asset monitoring apparatus comprising:
a unidirectional, data-protected control signal apparatus, in which data from locally arranged, protected databases is transferred via a network to the asset allocation and asset monitoring apparatus and is evaluated and in which electronic control signals and control data are transmitted to at least one authorized receiver station;
a filter module having a lookup table to associate portfolio elements in a memory unit with one another, the filter module periodically selecting data from the protected databases within a definable time window based on the associated portfolio elements and transmitting them to the data-protected control signal apparatus,
wherein
a weighting module associates the transferred data with the portfolio elements of the lookup table in weighted fashion on the basis of variable weighting parameters, the weighting parameters being generated at least on the basis of filtered and selected market sum value parameters for the respective portfolio element,
an index module includes at least one first, second and third incrementable memory stack, the first memory stack having a filtered market value factor, which is periodically incremented by a determinable first stack factor, the second memory stack having a filtered first return factor which is weighted by means of the filtered market value factor, the filtered first return factor being periodically incremented by a determinable second stack factor on the basis of coupon sum values, the third memory stack having a filtered second return factor which is weighted by means of the filtered market value factor, the filtered second return factor being periodically incremented by the determinable second stack factor on the basis of periodically detected quoted sum values of the portfolio elements, and
the data-protected control signal apparatus generates the electronic control signals and control data on the basis of unidirectionally filtered first, second and third memory stack values and to transmit them to the at least one authorized receiver station,
wherein the computer-aided asset allocation and asset monitoring apparatus is implemented as hardware or as a hardware/software combination.

2. The computer-aided asset allocation and asset monitoring apparatus as claimed in claim 1, wherein the electronic control signals and control data are graphically displayed on the receiver station, with the graphical display being periodically corrected perspectively in line with the control signal data.

3. The computer-aided asset allocation and asset monitoring apparatus as claimed in claim 1, wherein the index module includes a fourth memory stack, the fourth memory stack having a filtered third return factor which is weighted by the filtered market value factor and which is increased on the basis of a cumulation of the first return factor and second return factor, the index module generating the electronic control signals and control data on the basis of the unidirectionally filtered first, second, third and fourth memory stack values and transmitting them to the at least one authorized receiver station.

4. The computer-aided asset allocation and asset monitoring apparatus as claimed in claim 1, wherein, for the unidirectional filtering of the first, second and third memory stack values, the asset allocation and asset monitoring apparatus further comprises:
an interface module for the access-controlled transfer of the first, second and third memory stack values.

5. The computer-aided asset allocation and asset monitoring apparatus as claimed in claim 1, wherein the portfolio elements include definable parameters for catastrophe bonds.

6. The computer-aided asset allocation and asset monitoring apparatus as claimed in claim 1, wherein the filtered market value factor includes the market sum value of a portfolio element on the basis of a definable starting time value.

7. The computer-aided asset allocation and asset monitoring apparatus as claimed in claim 3, wherein the third return factor includes a sum value for a total profit from all portfolio elements.

8. The computer-aided asset allocation and asset monitoring apparatus as claimed in claim 1, wherein
the receiver station receives access-controlled, electronic control signal data by transferring access request data to a conditional access server via a network, and
the conditional access server transfers access authorization data on the basis of the access request data to the respective receiver station via the network.

9. The computer-aided asset allocation and asset monitoring apparatus as claimed in claim 1, wherein charging data is transmitted to a transaction server via a network to charge for a service used in receiving the electronic control signal data.

10. The computer-aided asset allocation and asset monitoring apparatus as claimed in claim 1, wherein chronological control signals and control data for each portfolio element are provided in a separate history module up to a stipulatable time in the past for transmission to one or more receiver stations.

11. The computer-aided asset allocation and asset monitoring apparatus as claimed in claim 1, wherein the data-protected control signal apparatus produces a unidirectional data stream, the receiver stations taking specific control signals and control data automatically from the unidirectional data stream, displaying them and storing them.

12. The computer-aided asset allocation and asset monitoring apparatus as claimed in claim 11, wherein the unidirectional data stream is an encapsulated data package stream.

13. The computer-aided asset allocation and asset monitoring apparatus as claimed in claim 11, wherein the unidirectional data stream is a DAB/DVB data stream.

14. A computer-aided asset allocation and asset monitoring method implemented by asset allocation and asset monitoring apparatuses comprising,
transferring, by a unidirectional data-protected control signal apparatus via a network, evaluated data from locally arranged, protected databases to the asset allocation and asset monitoring apparatuses;
transmitting, via the unidirectional data-protected control signal apparatus, electronic control signals and control data to at least one authorized receiver station,
associating, via a filter module in the asset allocation and asset monitoring apparatuses, portfolio elements in a memory unit with one another using a lookup table;
periodically selecting, via the filter module, on the basis of the associated portfolio elements, data from the protected databases within a definable time window and transferring them to the data-protected control signal apparatus;
associating, via a weighting module, the transferred data with the portfolio elements of the lookup table in weighted fashion on the basis of variable weighting parameters, the weighting parameters being generated at least on the basis of filtered and selected market sum value parameters for the respective portfolio element;
storing, in an index module, a first, second and third incrementable memory stack, the first memory stack having a filtered market value factor, which is periodically incremented by a determinable first stack factor, the second memory stack having a filtered first return factor which is weighted by means of the filtered market value factor, the filtered first return factor being periodically incremented by a determinable second stack factor on the basis of coupon sum values, the third memory stack having a filtered second return factor which is weighted by the filtered market value factor, the filtered second return factor being periodically incremented by the determinable second stack factor on the basis of periodically detected quoted sum values of the portfolio elements;
generating, via the index module the electronic control signals and control data on the basis of unidirectionally filtered first, second and third memory stack values, and also a third return factor having the second and third memory stacks; and
transmitting, via the index module, the electronic control signals and control data to the at least one authorized receiver station,
wherein the computer-aided asset allocation and asset monitoring apparatus is implemented as hardware or as a hardware/software combination.

15. The computer-aided asset allocation and asset monitoring method as claimed in claim 14, wherein the control signal data are graphically displayed by the receiver station, the graphical display being periodically corrected perspectively in line with the control signal data.

16. The computer-aided asset allocation and asset monitoring method as claimed in claim 14, wherein the index module
weighs the third return factor using the filtered market value factor,
transfers the third return factor to a fourth memory stack, which is incremented on the basis of a cumulation of the first and second return factors,
generates the electronic control signals and control data on the basis of the unidirectionally filtered first, second, third and fourth memory stack values, and
transmits them to the at least one authorized receiver station.

17. The computer-aided asset allocation and asset monitoring method as claimed in claim 14, further comprising:
filtering the first, second and third memory stack values unidirectionally, wherein an interface module in the asset allocation and asset monitoring apparatus transfers the first, second and third memory stack values under access control for a user.

18. The computer-aided asset allocation and asset monitoring method as claimed in claim 14, wherein at least some of the portfolio elements are generated as definable parameters for catastrophe bonds.

19. The computer-aided asset allocation and asset monitoring method as claimed in claim 14, wherein the filtered market value factor is at least partly generated as a market sum value for a portfolio element on the basis of a definable starting time value.

20. The computer-aided asset allocation and asset monitoring method as claimed in claim 14, wherein the third return factor is generated as a sum value for a total profit from all portfolio elements.

21. The computer-aided asset allocation and asset monitoring method as claimed in claim 14, wherein the receiver station that receives access-controlled, electronic control signals and control data transfers access request data to a conditional access server via a network, and wherein the conditional access server transfers access authorization data on the basis of the access request data to the respective receiver station via the network.

22. The computer-aided asset allocation and asset monitoring method as claimed in claim 14, wherein charging data for charging for a service used in receiving the electronic control signals and control data are transmitted to a transaction server via a network.

23. The computer-aided asset allocation and asset monitoring method as claimed in claim 14, wherein chronological control signals and control data for each portfolio element are provided in a separate history module up to a stipulatable time in the past for access by the receiver stations.

24. The computer-aided asset allocation and asset monitoring method as claimed in claim 14, wherein the data-protected control signal apparatus produces a unidirectional data stream, with receiver stations taking specific control signals and control data automatically from the unidirectional data stream, displaying them and storing them.

25. The computer-aided asset allocation and asset monitoring method as claimed in claim 24, wherein the unidirectional data stream is generated as an encapsulated data package stream.

26. The computer-aided asset allocation and asset monitoring method as claimed in claim 14, wherein the unidirectional data stream is generated as a DAB/DVB data stream.

27. A non-transitory computer-readable medium storing computer readable instructions thereon that when executed by a computer cause the computer to perform the method according to claim 14.

* * * * *